United States Patent [19]

Strehlow

[11] Patent Number: 4,773,796
[45] Date of Patent: Sep. 27, 1988

[54] AIR SLIDE CONVEYER

[76] Inventor: Robert W. Strehlow, 12912 W. Prospect Dr., New Berlin, Wis. 53157

[21] Appl. No.: 382,688

[22] Filed: May 27, 1982

[51] Int. Cl.$^4$ .............................................. B65G 53/18
[52] U.S. Cl. ........................................ 406/89; 406/138
[58] Field of Search ............... 406/89, 90, 138, 88, 406/64

[56] References Cited

U.S. PATENT DOCUMENTS

| 2,676,851 | 4/1954 | Sylvest | 406/89 |
| 3,475,058 | 10/1969 | Sanders | 406/88 |
| 3,774,972 | 11/1973 | Grapenglesser et al. | 406/89 |
| 3,975,057 | 8/1976 | Hurd | 406/84 |
| 4,138,047 | 2/1979 | Sherman | 406/88 |

FOREIGN PATENT DOCUMENTS 75683  7/1978  Japan ........................................ 406/88

Primary Examiner—Galen L. Barefoot
Assistant Examiner—Paul E. Salmon
Attorney, Agent, or Firm—George A. Evans

[57] ABSTRACT

A plenum chamber for an air slide conveyer is provided with two air chambers one within the other. The inner chamber communicates with a medial strip of the membrane which separates the chambers from the rest of the duct through which the material passes when fluidized by air from the plenum chamber. The central air duct also serves to support the membrane which is drawn over it and then clamped between the two halves of the duct. The supply of air to either the outer or inner chamber may be separately shut off. The lower half may be removed as a unit for repair or replacement of the membrane. A novel seal is provided for preventing the edges of the membrane from becoming wet and acting as a wick to moisten and clog the central portions of the membrane.

3 Claims, 1 Drawing Sheet

AIR SLIDE CONVEYER

BACKGROUND OF THE INVENTION

Air slides are frequently used for moving powdered materials through a duct or conduit at desired or controlled rates of flow. The duct is divided into two positions by an air-permeable membrane supporting the material and means are provided for maintaining air under pressure against the underside of the membrane. The air passing through the membrane fluidizes the material and enables it to flow by gravity if the duct is tilted at an appropriate angle.

Air is supplied to the plenum chamber at one end of the duct and the membrane is generally clamped between the two halves of the duct, each half having opposed outwardly extending flanges for such clamping purposes. U.S. Pat. No. 2,676,851 issued Apr. 27, 1954 to Sylvest is a typical example of what has just been described.

In some instances, instead of a diaphram or membrane separating the plenum chamber from the rest of the duct, a perforated deck is employed for this purpose. The pressure of the air passing through the orifice may be varied, for instance by using two plates or decks, each with orifices, the effective size of which may be varied by sliding the plates with respect to each other so that portions of the apertures are closed. An example of this construction is shown in U.S. Pat. No. 3,475,058 to Sanders, issued Oct. 28, 1969.

The Sanders patent also provides for raising and lowering the lower deck to provide lateral grooves for passage of air and in addition, there is provided a narrower central plenum chamber through which air at different pressure may pass into the material being conveyed. The articles being conveyed are referred to as "objects such as sheets of paper cardboard, or hardboard, strips of materials, or bulky articles such as cartons, or boxes, or granular materials". Most of these materials would be incapable of being fluidized, and the provision of the slots might be effective when solid objects are being moved, without likelihood of leakage into the plenum chamber. When pulverulent material, such as cement, is to be moved, the efficacy of apparatus such as shown in Sanders is seriously doubted. At any rate, it would be necessary to build up substantial pressure in the plenum chamber before the lower deck was lowered to enable air to pass through the lateral slots. It would also be necessary to close the slots before the pressure was reduced or completely shut off. Consequently, operation and control would be extremely difficult.

The present invention relates to an improved conduit through which material may be moved under the propulsion of air which passes through a membrane to fluidize the material being conveyed. The plenum chamber providing a passageway for the flow of air is divided into two sections and separate air supply means communicate with each section. By interrupting the flow of air to one of the sections, the rate of flow of material may be materially reduced so that the shut-off gate at the outlet end of the conduit may be closed with less dribble or spillage of material.

This is a major consideration because if the conveyer is feeding cement, for instance, into a batcher, it is important to cut off the feed abruptly when the desired amount of cement has been weighed. Alternatively, it may be necessary to "jog" the cut off gate for final accurate cut-off control.

The provision of a separate air chamber within the main or normal air chamber makes it possible to pre-cut off either the inner or outer channel. If the inner channel communicates with approximately one third of the air membrane area, either a one-third or two-thirds final flow rate may be selected. This provides a simple and accurate two stage or slow down in the flow rate prior to final cut-off.

Other features of this invention are the means by which the life of the cloth membrane may be extended and when cleaning or replacement of the cloth is necessary, the operation may be facilitated. Thus the entire lower assembly of which the cloth is an integral part can be removed so that repair or replacement of cloth can occur at a convenient repair location. The inlet, outlet and upper chamber remain in place.

To avoid external moisture from wetting the ends of the cloth so that the cloth acts as a wick absorbing moisture and eventually wetting the inner portions of the cloth as well, an effective rubber seal is provided between the two halves of the slide where they overlap and are clamped together. This is important too because the slides are frequently located outside and are subject to rain and wind and also from water which is used to hose off or wash down the outside of the slide.

SUMMARY OF THE INVENTION

A plenum chamber for an air slide conveyer is provided with two air chambers one within the other. The inner chamber communicates with a medial strip of the membrane which separates the chambers from the rest of the duct through which the material passes when fluidized by air from the plenum chamber. The central air duct also serves to support the membrane which is drawn over it and then clamped between the two halves of the duct. The supply of air to either the outer or inner chamber may be separately shut off. The lower half may be removed as a unit for repair or replacement of the membrane. A novel seal is provided for preventing the edges of the membrane from becoming wet and acting as a wick to moisten and clog the central portions of the membrane.

DESCRIPTION OF THE PREFERRED EMBODIMENT

Figure 1:
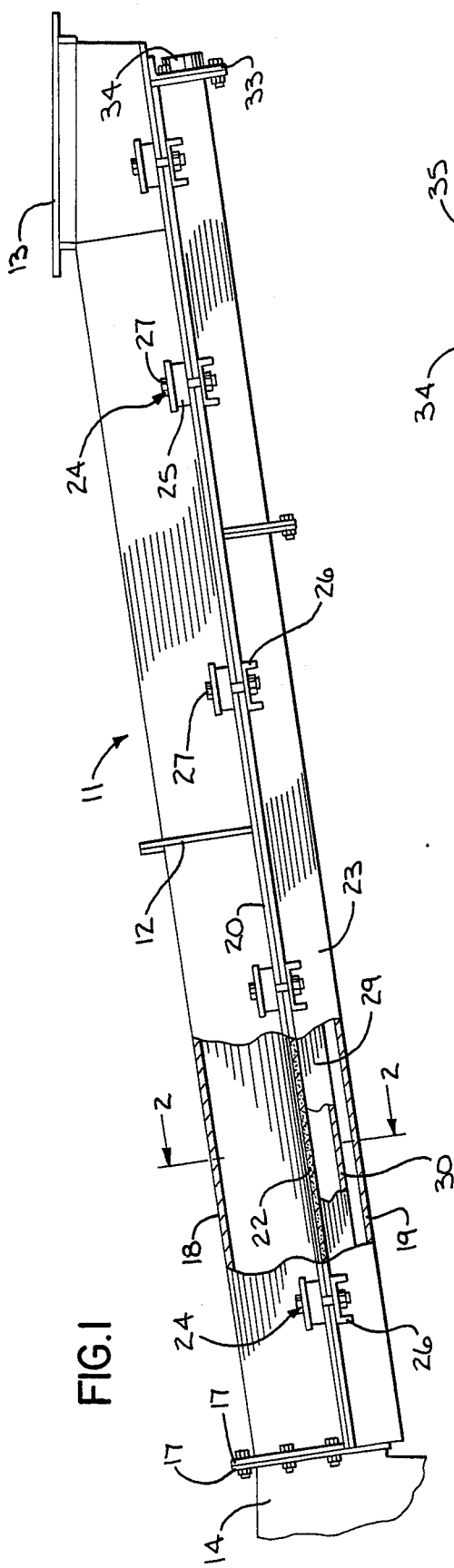
FIG. 1 is a side elevation of an air slide for conveying cement or other powdered material.

The slide shown in the drawings may be of any desired length. It is preferable to fabricate it in sections of standard lengths, say of approximately ten to eleven feet. The slide 11 represents a single section. It hangs at an angle of approximately 6° to 7° from the horizontal. The stiffener ribs 12 which are located about every five feet and enclose the upper portion of the slide have apertures 12' through which a cable or other suitable support may extend from an over-head frame member (not shown).

The upper end of the duct 11 has an opening 13 through which the cement or other material to be fed is introduced into the upper half of the slide. The lower end communicates with a chamber 14 in which there is mounted a rotary shut off gate. The gate is operated by a long stroke air cylinder under suitable controls. These sections have flanges 17 which mate with corresponding flanges on the ends of the medial section of the slide to which they are bolted and sealed by use of an intermediate gasket.

Figure 2:
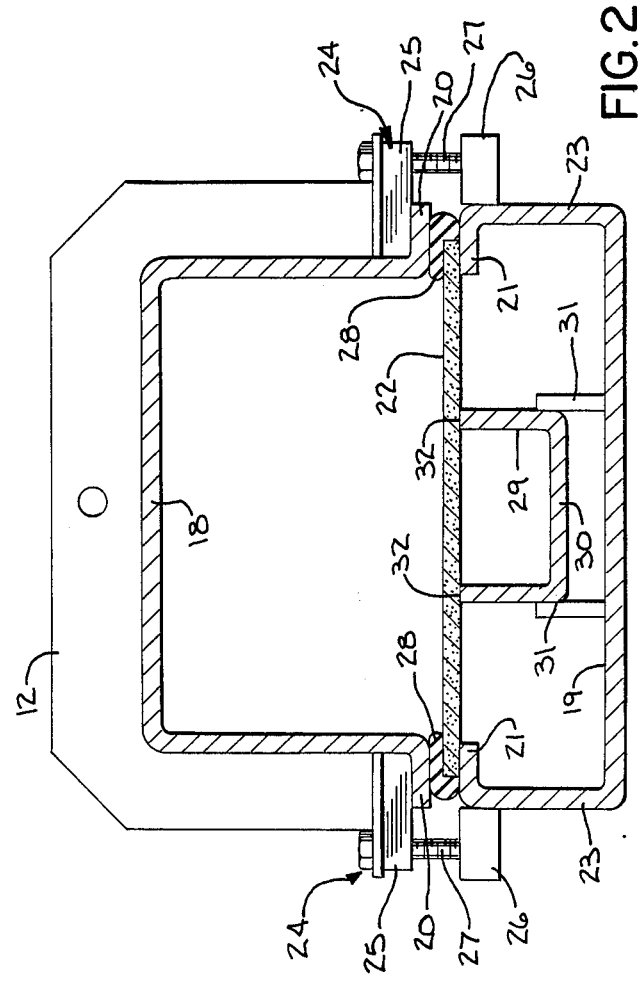
FIG. 2 is a section taken on the line 2—2 of FIG. 1.

The duct 11 consists of two channels 18 and 19, the upper channel 18 through which the material passes having outwardly extending flanges 20 at its lower edges. The lower channel 19 which serves as the primary plenum chamber has inwardly extending flanges 21 which align with the channels 20 as shown in FIG. 2.

Between the two channels 19 and 20 is the strip of pervious material or membrane 22 through which air can pass under pressure from the plenum chamber to the upper duct through which material flows. The membrane extends from the full length of the slide 11. Its width is slightly less than the outer width provided by the flanges 20 but still a substantial portion of the membrane lies between the flanges 20 and 21 when it is interposed between the channels. The width of the lower channel 19 is sufficiently greater than the width of the upper channel so that the outer sides 23 of the lower channel are spaced apart the same width at the outer ends of flanges 20. In other words, both surfaces between which the membrane 22 lies extend outwardly a short distance beyond the end edges of the membrane. Making the channel 19 wider than channel 18 also increases the volume of the air space provided therein.

A series of clamps 24 located about every 2½ feet apart clamp the channels together. They consist of the bracket members 25 welded to the top of flanges 20 and the bracket members 26 welded to outer sides of the channel 19 and the bolts 27 securing them together.

On the upper surface of the portions of the membrane which are to be clamped together lies a strip of foam rubber 28 of a width slightly narrower (prior to compression) than the overlap between the two opposing chambers 18 and 19. Obviously a sealing strip is provided on each side of the slide. Each strip when compressed bulges out at its ends, and the portion which extends to the outside of the membrane 22 spreads into the space between the flanges 20 and 21. It consequently serves as a seal to prevent moisture or rain from wetting the outer edges of the membrane. Should the latter be wetted, the membrane serves as a wick drawing the moisture into the central portion and interfering with its permeabiity to the passage of air.

The provision of the inwardly turned flanges 21 on the lower channel 19 and the outwardly turned flanges 20 on the channel 18, as previously described, enables the brackets 25 to extend outside the ends of the flanges 20 and bolts connecting brackets 25 and 26 to pass outside rather than through the flanges and the seal.

Disposed centrally with respect to the primary channel 19 is a secondary channel 29, the web 30 of which is about ⅓ of the width of channel 18. The open side of this channel 29 faces the membrane 22 which is drawn across it to provide for passage of air from channel 29 to material in the duct which is directly above this portion of the membrane. The channel 29 is supported on the channel 19 by a series of spaced risers 31 which afford a minimum of obstruction to the passage of air through the larger channel 19. It is desirable to have the upper edges 32 of the inner channel extend slightly above the flanges 21 of the primary channel 19 so that the membrane 22 may be drawn down on these edges and be supported thereby when the membrane is clamped between the two halves of the slide. Actually, the membrane is fastened at suitable intervals to the inwardly extending flanges 21 of the lower channel 19 so that when the latter is removed, as will be subsequently explained, the membrane remains adhering to this channel.

Figure 3:
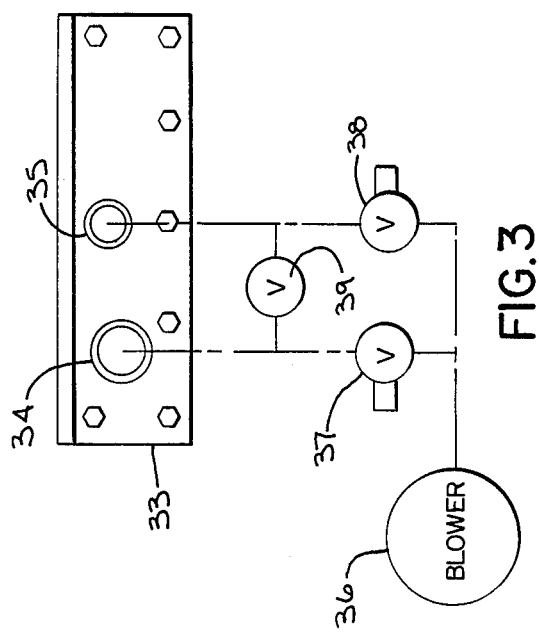
FIG. 3 is an end view of the slide showing how the air ducts communicate with the several portions of the plenum chamber.

The upper end of the slide is provided with an end plate 33 which is apertured to provide fittings for the introduction of air into the channels 19 and 29 as shown in FIG. 3.

The larger opening 34 is off to one side and communicates with the larger channel 19, where the smaller opening 35 communicates with the inner channel 29. Air is supplied to the openings 34 and 35 through suitable piping diagrammatically shown in FIG. 1 from a blower 36. The valve 37 controls the flow of air from the blower to the outer channel 19 while the valve 38 controls flow to the inner channel 29. An optional manual damper 39 disposed between the lines leading to the two channels enables diversion of air between the channels so that even if one valve 37 or the other 38 is closed some air may be bled into the channel not otherwise operating. Ordinarily a pressure of approximately three p.s.i. is required for operation of the side. Capacity, according to industry standards, is rated at 3,000 cubic feet of cement per hour with a duct for conveying material approximately 10 inches wide and approximately 6 inches deep.

The operation of the device comprises the entry of material through the opening 12 and the opening of the gate 15 through which the material is discharged. Air is simultaneously introduced into the inner and outer compartments 19 and 29 of the plenum chamber. The air passing through the inner chamber fluidizes and moves forward a strip of material directly above it while the air from the outer chamber similarily acts on the outer strips of material disposed above the membrane. Supply of air to either channel can be reduced or completely shut off with a resulting decrease in flow of material. By reducing the rate of flow, it is possible to shut off the gate 15 with less dribble and possible spillage. This makes for more accurate measurement of the material being fed.

When it is necessary to clean or replace the cloth on membrane 22 the clamps 24 are opened and the bolts are removed which connect the lower half of the slide to the end plate 33 through which air enters the plenum chambers. The lower portion with the membrane adhering thereto is then removed and taken to a suitable servicing location. The remaining portions of the slide remain in place for subsequent reassembly.

The invention having been described what is claimed is:

1. In an air slide conveyer, an elongated duct for the passage of a commingled mass of fluidizable material such as cement, said conveyer comprising an upper channel having an opening on its lower side, an air permeable membrane extending across said opening and confining the material to be conveyed to the space above the membrane, a U shaped plenum channel arranged beneath said membrane having a width corresponding to the width of said membrane, a second U shaped plenum channel member arranged within said first named plenum channel with its open side communicating with a medial strip of said membrane, said channels being substantially co-extensive in length means for supplying air under pressure through the ends of each of said plenum channels to fluidize the entire bed of material above all sections of the membrane, and means for reducing the flow of air to either of said channels to vary the flow of material through the conveyer.

2. Apparatus as set forth in claim 1 in which the second inner disposed U shaped plenum channel member is mounted on the outer plenum channel and itself supports the medial portion of the membrane.

3. Apparatus as set forth in claim 1, in which the membrane is fastened to the plenum channel and the plenum channel and the membrane can be detached and removed from the rest of the structure without altering the latter's position.

* * * * *